3,040,075
METHOD OF MAKING FATTY ALKANOL AMIDES
John W. Lohr, Cincinnati, Ohio, assignor to The Andrew Jergens Company, Cincinnati, Ohio, a corporation of Ohio
No Drawing. Filed June 20, 1957, Ser. No. 667,049
1 Claim. (Cl. 260—404)

This invention relates to a method of producing high molecular weight amides of a type sutiable for use in various detergent compositions as foam stabilizers, for instance in shampoos. In general, this type of amide is the reaction product of diethanolamine and a fatty acid of from 6–22 carbon atoms chain length.

The object of the present invention is to provide a method or process of producing an amide of the type in question efficiently and in a state of relatively high purity, i.e., with minimum contamination of by-products or excess reactant.

The problem to which the present invention is directed rises primarily from the circumstance that diethanolamine may react at any one of three points, i.e., at the NH group or at either OH group. Hence, a single molecule of diethanolamine may react with three molecules of fatty acid to produce a very complex molecule which may be termed a diesteramide or may react wtih two molecules of fatty acid to form an ester amide, or a diesteramine, or may react with one molecule of fatty acid to form an esteramine or an amide. The amide forming reaction, to the exclusion of all the others, is the desideratum.

The usual amide forming reaction is promoted by a molecular ratio of diethanolamine to fatty acid of at least 2–1 and the use of a temperature between 250° and 350° F. for a period of 12–18 hours. In the reaction water is formed and caused to distill off by heat, thus forcing the reaction toward completion; otherwise the reaction reaches an equilibrium. Further, the reaction rate is limited by temperature, and must necessarily be relatively slow because unless the temperature is kept at a low level the reaction forming the ester amines tends to become dominant.

The desired amide has been prepared by reacting diethanolamine with the methyl ester of a fatty acid. This reaction also relies on distillation, in which case the removal of methyl alcohol rather than water forces the reaction toward completion. The major advantage of this method of processing rests in the reduced ratio of alkanolamine to fatty acid required. However, a major disadvantage to the method is that the reaction must be stopped somewhere short of completion because the temperatures required to drive off the last of the methyl alcohol tend to favor formation of ester amine. The commercial product produced by this method is thus contaminated by the unreacted methyl esters and free amine. The fact that methyl esters of the fatty acids inhibit the activity of the amide in most detergent uses where foaming power is the important consideration is a serious disadvantage.

The present invention is predicated upon the discovery and determination that diethanolamine may be reacted with fatty triglycerides to produce a very high yield of very pure amides without removal of the glycerine during the reaction. According to the method of the present invention, 4.2 mols of diethanolamine may be reacted with one mol of fatty triglyceride to produce a final product which consists of substantially 95% pure amide and substantially 5% pure glycerine. The latter is a satisfactory foam stabilizer and the residual glycerine is not a harmful contaminant for most of the purposes for which amides of the type in question are used. Further, this degree of purity is achieved without subjecting the amide to distillations or other thermal conditions which tend to produce secondary molecular arrangements which deteriorate the pure amide content of the composition. Thus, this invention provides a relatively simple, economical and efficient method of attaining relatively high selectivity of an amide producing reaction with minimum production of unwanted components.

The method of the present invention involves two steps the first of which is the reaction of the diethanolamine and the fatty triglyceride and the second of which is the separation of the products which are present at the end of the reaction. For many purposes, the product is commercially satisfactory and acceptable at the end of the first step; for other purposes, the second step is desirable.

In the first step at least 4.2 mols of diethanolamine are reacted with one mol of a fatty triglyceride such as coconut oil. Inasmuch as the fatty triglyceride contains three fatty acids radicals, the molecular ratio is 1.4 mols diethanolamine to one mol fatty acid radical or 4.2 mols of triglyceride. While a greater proportion of amine may be used, the ratio is preferably not above 6 mols and preferably between 4.2 and 4.5 mols of amine to one mol of triglyceride because of the added difficulty of removing the excess amine.

The primary reaction is accomplished by mixing the two components together and heating them at a temperature in the range of 240°–260° F., but preferably not above 250° F. During the early part of the treatment a somewhat higher temperature can be used if desired, but the temperature must be reduced to about 250° F. after the reacting components have combined into a single phase. The reaction is continued for a period of from 12–18 hours, depending upon the desired purity of the end product. The product which results from the 18 hour reaction consists substantially of 80% amide, 12% free amine and 8% glycerine. As indicated, this product without further treatment is suitable for various uses such as a component of a detergent or other cosmetic preparations, etc., where the alkaline nature of the product is not undesirable. However, for other purposes, where the excess alkalinity is objectionable, it is desirable to proceed to the second step of the process in which the excess alkalinity and a portion of the glycerine are removed.

The second step, the purification of the crude amide, consists in treating the crude amide with phosphoric acid to remove the free amine and part of the glycerine as a separable phosphate complex. For this purpose, 85% phosphoric acid of commerce may be used in an amount in the range of 6–9 parts by weight of phosphoric acid to 100 parts by weight of crude amide. The operation is preferably performed at an elevated temperature such as about 160°–200° F.; for instance 180° F., which temperature does not tend to degenerate the amide, and the reduced viscosity obtained promotes the separation of the two phases formed.

The crude amide and phosphoric acid are agitated together until thoroughly mixed, then the mixture is permitted to settle in a tank after which the phosphoric acid phase, which contains the free amine and part of the glycerine is decanted. Alternatively, the mixture may be centrifuged, but in either case a gravity separation of the phases is employed. The resulting end product consists of substantially 95% of the desired alkanol amide and 5% pure glycerine, which, being inert and water soluble, is not a harmful contaminant for most purposes for which the amide is used.

As indicated, a wide variety of fatty triglycerides may be used in the practice of this process including all of the natural triglycerides which are found in animal, vegetable and marine fats and oils; for instance, coconut oil, tallow, fish oil, cottonseed oil, soybean oil, lard, etc., are all applicable to making the products of this invention. In place of the diethanolamine the following amines may be substituted: diisopropanol amine and 2 amino-2 methyl-propanediol 1–3.

In fact, the method is applicable to all substituted secondary amines where additional reactive groups such as primary or secondary OH groups may result in competing side reactions, which are undesirable in the final product.

Examples of the practice of this method are as follows:

Example I

One hundred pounds of refined and bleached coconut ol was heated with 67 pounds of diethanolamine (1.4 times the amount theoretically required to convert all the fatty glyceride to amide and free glycerine) to a temperature of 250° F. ± 5° for 18 hours with sufficient agitation to disperse the reactants. After five hours at the reaction temperature the mixture cleared to a single liquid phase. Agitation was reduced and heating continued at 250° F. until after 18 hours the basic nitrogen titration showed that all the fat had reacted. At this point the heating was stopped and the product analyzed. Amide content was found to be 80.5% and amine ester content less than 1%.

Example II

One hundred pounds of refined and bleached tallow was heated with 66 pounds of diisopropanolamine (1.4 times the theoretical amount) to a temperature of 250° F. ± 5° for 18 hours with good agitation. After about 6 hours, the mixture became clear. Heating was continued for a total of 18 hours until the basic nitrogen value of the mixture had dropped to 1.23. At this point heating was stopped. Amide content was found to be 82% with less than 1% ester amine content.

Example III

One hundred parts of cottonseed oil was heated with 52 parts of 2 methyl-2 amino propanediol 1–3, with good agitation to prevent local over-heating. Temperatures were maintained as in Examples I and II above to favor amide formation and inhibit ring closure. The end product contained 83% amide and less than 2% cyclic amine.

Example IV

In refining the product of Example I, 100 parts of the product of Example I were treated with 8½ parts of the 85% phosphoric acid of commerce at a temperature of 180° F. The mixture was agitated for a period of one hour and allowed to settle two hours. Upon settling, two layers were formed. The upper layer consisted of 85 parts of fatty alkylol amide analyzing 94% fatty amide and 6% glycerine. No free amine was detected in this layer. The lower layer consisted of 23½ parts of a syrupy mixture of phosphorylated glycerine and decthanolamine phosphate. No fatty material could be obtained from the lower layer.

Example V

In refining the product of Example I, 100 parts of the product of Example I were treated with 7 parts of the 85% phosphoric acid of commerce at a temperature of 180° F. The mixture was agitated for a period of one hour and allowed to settle for 2 hours. The upper layer formed consisted of 87 parts of a fatty alkylol amide analyzing 92% fatty amide and 8% glycerine. No free amine was detected in this layer. The lower layer consisting of 20 parts was substantially a mixture of phosphorylated glycerine and diethanolamine phosphate. No fatty material could be obtained from the lower layer.

It may be desired to produce mixtures of amides and monoglycerides. These products show unusual viscosity properties when admixed with anionic agents. To produce such a product it is necessary to do one of two things. Either the ratio of alkanolamine to fat may be reduced to give the desired end product, or a reaction at higher amine ratio may be halted before completion. Depending on the particular mol ratio of alkanol amide to monoglyceride desired in the end product, from 2.2 mols to 4.2 mols of diethanolamine to one mol of fat may be employed. The reaction conditions utilized are the same as previously described. The method of forming such a product is given in Example VI.

Example VI

One hundred parts of refined, bleached, and deodorized coconut oil were heated together with 35 parts of diethanolamine with good agitation to a temperature of 250° F. ± 5° F. for 7 hours, at which time the basic nitrogen titration was 1.8% (3.46% initial value). At the end of 18 hours at 250° F. the value had dropped to 0.28%. Analysis revealed a composition of 2.1% unreacted amine, 66% diethanolamide of coconut fatty acids, 31.6% of coconut monoglyceride and 0.3% glycerine. No ester amine was detected.

Three and three-tenths parts of the product of Example VI were added to 96.7 parts of a 10% aqueous solution of monoisopropanolamine lauryl sulfate. The resulting clear solution had a viscosity of 1100 c.p.s. The 10% lauryl sulfate solution alone had a viscosity of 30 c.p.s.

Example VII

In another reaction under conditions of Example VI where 2.7 mols of diethanolamine were heated with refined, bleached and deodorized coconut oil, the resulting product analyzed 71.4% diethanolamide, 4.5% unreacted diethanolamine, 20.9% monoglyceride, and 2.9% glycerine. A mixture of five parts of the product of Example VII with 95 parts of 10% monoisopropanolamine lauryl sulfate yielded a clear solution having a viscosity of 2600 c.p.s.

Similar results to those shown in the above examples may be obtained by employing glycol or other polyol esters as starting materials in proper mol ratio in lieu of the naturally occurring glycerides.

All quantities in the foregoing examples have been by weight.

Having described my invention, I claim:

The method of making fatty alkanol amides, said method comprising heating the dialkanolamines with fatty triglycerides at a temperature of substantially 240°–260° F. for a period of substantially 12–18 hours, the molecular proportion of amine to triglyceride being in the range of 4.2–1 to 6–1, mixing the resulting product with phosphoric acid to segregate the excess amine and some of the glycerine in the phosphoric acid phase and removing said phosphoric acid phase from the amide fraction and the remainder of the glycerine by gravity separation, the phosphoric acid being about 85% of phosphoric acid of commerce, the amount of phosphoric acid being about 6–9 parts by weight of phosphoric acid to 100 parts by weight of crude amine, and the temperature at which the separation is conducted being about 160°–200° F.

References Cited in the file of this patent

UNITED STATES PATENTS

| | | |
|---|---|---|
| 2,094,608 | Kritchevsky | Oct. 5, 1937 |
| 2,173,909 | Kritchevsky | Sept. 26, 1939 |